(12) United States Patent
Golden (10) Patent No.: US 10,656,850 B2
(45) Date of Patent: *May 19, 2020

(54) EFFICIENT VOLUME REPLICATION IN A STORAGE SYSTEM

(71) Applicant: PURE STORAGE, INC., Mountain View, CA (US)

(72) Inventor: Christopher Golden, Emerald Hills, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,560

(22) Filed: Dec. 21, 2018

(65) Prior Publication Data

US 2019/0155523 A1 May 23, 2019

Related U.S. Application Data

(63) Continuation of application No. 15/337,387, filed on Oct. 28, 2016, now Pat. No. 10,185,505.

(51) Int. Cl.
*G06F 3/06* (2006.01)

(52) U.S. Cl.
CPC ............ *G06F 3/0619* (2013.01); *G06F 3/065* (2013.01); *G06F 3/0611* (2013.01); *G06F 3/0665* (2013.01); *G06F 3/0688* (2013.01)

(58) Field of Classification Search
CPC ...... G06F 3/0619; G06F 3/065; G06F 3/0665; G06F 3/0688
See application file for complete search history.

(56) References Cited

U.S. PATENT DOCUMENTS 5,208,813 A   5/1993   Stallmo
5,403,639 A   4/1995   Belsan
(Continued)

FOREIGN PATENT DOCUMENTS

CN   103370685 A   10/2013
CN   103370686 A   10/2013
(Continued)

OTHER PUBLICATIONS

Kun Ren, Zhanhuai Li, Chao Wang, Nan Jiang, Design of data replication system on FreeBSD, 2010, IEEE 2010 International Conference on Data storage and Data Engineering (Year: 2010).*

(Continued)

*Primary Examiner* — Khoa D Doan
(74) *Attorney, Agent, or Firm* — Womble Bond Dickinson (US) LLP; Daniel E. Ovanezian (57) ABSTRACT

An indication to replicate, for a second storage resource, a volume that is stored at a first storage resource may be received. A snapshot of the volume that is stored at the second storage resource may be identified. Data with operations to data blocks of the volume may be identified. A sequence number range, containing one or more sequence numbers, associated with the snapshot of the volume that is stored at the second resource may be received. Furthermore, a portion of the data associated with the operations to the data blocks of the volume based on the sequence number range that is associated with the snapshot of the volume that is stored at the second resource may be received to replicate the volume at the second storage resource.

18 Claims, 6 Drawing Sheets

(56) References Cited

U.S. PATENT DOCUMENTS

| | | | |
|---|---|---|---|
| 5,940,838 A | 8/1999 | Schmuck et al. | |
| 6,263,350 B1 | 7/2001 | Wollrath et al. | |
| 6,286,056 B1 | 9/2001 | Edgar et al. | |
| 6,412,045 B1 | 6/2002 | DeKoning et al. | |
| 6,718,448 B1 | 4/2004 | Ofer | |
| 6,757,769 B1 | 6/2004 | Ofer | |
| 6,799,283 B1 | 9/2004 | Tamai et al. | |
| 6,804,703 B1 | 10/2004 | Allen et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,954,881 B1 | 10/2005 | Flynn, Jr. et al. | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,139,907 B2 | 11/2006 | Bakke et al. | |
| 7,216,164 B1 | 5/2007 | Whitmore et al. | |
| 7,272,674 B1 | 9/2007 | Nandi et al. | |
| 7,313,636 B2 | 12/2007 | Qi | |
| 7,325,111 B1* | 1/2008 | Jiang | G06F 11/1451 711/162 |
| 7,331,000 B2 | 2/2008 | Ohno et al. | |
| 7,577,802 B1 | 8/2009 | Parsons | |
| 7,739,464 B1* | 6/2010 | Coulter | G06F 11/1466 711/162 |
| 7,769,722 B1 | 8/2010 | Bergant et al. | |
| 7,783,682 B1 | 8/2010 | Patterson | |
| 7,827,350 B1 | 11/2010 | Jiang et al. | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,086,652 B1 | 12/2011 | Bisson et al. | |
| 8,103,754 B1 | 1/2012 | Luong et al. | |
| 8,117,464 B1 | 2/2012 | Kogelnik | |
| 8,200,887 B2 | 6/2012 | Bennett | |
| 8,205,065 B2 | 6/2012 | Matze | |
| 8,301,811 B1 | 10/2012 | Wigmore et al. | |
| 8,352,540 B2 | 1/2013 | Anglin et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,645,649 B2 | 2/2014 | Kaiya et al. | |
| 8,700,875 B1 | 4/2014 | Barron et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | Lecrone et al. | |
| 9,063,937 B2 | 6/2015 | McDowell et al. | |
| 9,081,713 B1 | 7/2015 | Bennett | |
| 9,189,334 B2 | 11/2015 | Bennett | |
| 9,294,567 B2 | 3/2016 | Hussain et al. | |
| 9,311,182 B2 | 4/2016 | Bennett | |
| 9,423,967 B2 | 8/2016 | Colgrove et al. | |
| 9,430,412 B2 | 8/2016 | Huang | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,501,245 B2 | 11/2016 | Hussain et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 9,565,269 B2 | 2/2017 | Malwankar et al. | |
| 9,632,870 B2 | 4/2017 | Bennett | |
| 9,639,543 B2 | 5/2017 | Li et al. | |
| 9,880,758 B1 | 1/2018 | Bora et al. | |
| 10,146,631 B1* | 12/2018 | Pradeep | G06F 16/27 |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2003/0131278 A1 | 7/2003 | Fujibayashi | |
| 2003/0140209 A1 | 7/2003 | Testardi | |
| 2003/0158861 A1 | 8/2003 | Sawdon et al. | |
| 2003/0167380 A1 | 9/2003 | Green et al. | |
| 2003/0182312 A1* | 9/2003 | Chen | G06F 11/1435 |
| 2003/0182313 A1* | 9/2003 | Federwisch | G06F 11/2066 |
| 2003/0182325 A1* | 9/2003 | Manley | G06F 11/2066 |
| 2004/0030727 A1 | 2/2004 | Armangau et al. | |
| 2004/0049572 A1 | 3/2004 | Yamamoto et al. | |
| 2004/0172577 A1 | 9/2004 | Tan et al. | |
| 2004/0250033 A1 | 12/2004 | Prahlad et al. | |
| 2004/0260895 A1* | 12/2004 | Werner | G06F 11/2082 711/162 |
| 2004/0267836 A1* | 12/2004 | Armangau | G06F 11/1435 |
| 2004/0268067 A1 | 12/2004 | Yamagami | |
| 2005/0066095 A1 | 3/2005 | Mullick et al. | |
| 2005/0216535 A1 | 9/2005 | Saika et al. | |
| 2005/0216536 A1 | 9/2005 | Stager et al. | |
| 2005/0223154 A1 | 10/2005 | Uemura | |
| 2006/0074940 A1 | 4/2006 | Craft et al. | |
| 2006/0136365 A1 | 6/2006 | Kedem et al. | |
| 2006/0155946 A1 | 7/2006 | Ji | |
| 2007/0067585 A1 | 3/2007 | Ueda et al. | |
| 2007/0109856 A1 | 5/2007 | Pellicone et al. | |
| 2007/0113007 A1 | 5/2007 | Murayama et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 | 9/2007 | Katsuragi et al. | |
| 2007/0245090 A1 | 10/2007 | King et al. | |
| 2007/0266179 A1 | 11/2007 | Chavan et al. | |
| 2008/0034167 A1 | 2/2008 | Sharma et al. | |
| 2008/0059699 A1 | 3/2008 | Kubo et al. | |
| 2008/0065852 A1 | 3/2008 | Moore et al. | |
| 2008/0126734 A1 | 5/2008 | Murase | |
| 2008/0134174 A1 | 6/2008 | Sheu et al. | |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0282045 A1 | 11/2008 | Biswas et al. | |
| 2008/0285083 A1 | 11/2008 | Aonuma | |
| 2008/0307270 A1 | 12/2008 | Li | |
| 2009/0006587 A1 | 1/2009 | Richter | |
| 2009/0037662 A1 | 2/2009 | La Frese et al. | |
| 2009/0043958 A1 | 2/2009 | Kaneda et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077165 A1* | 3/2010 | Lu | G06F 11/1451 711/162 |
| 2010/0077205 A1 | 3/2010 | Ekstrom et al. | |
| 2010/0082879 A1 | 4/2010 | McKean et al. | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 | 7/2010 | Zhang et al. | |
| 2010/0250802 A1 | 9/2010 | Waugh et al. | |
| 2010/0250882 A1 | 9/2010 | Hutchison et al. | |
| 2010/0281225 A1 | 11/2010 | Chen et al. | |
| 2010/0287327 A1 | 11/2010 | Li et al. | |
| 2011/0072300 A1 | 3/2011 | Rousseau | |
| 2011/0121231 A1 | 6/2011 | Haas et al. | |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0096230 A1 | 4/2012 | Sampathkumar | |
| 2012/0117029 A1 | 5/2012 | Gold | |
| 2012/0198175 A1 | 8/2012 | Atkisson | |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 | 8/2013 | Kettner | |

(56) References Cited

U.S. PATENT DOCUMENTS

| | | |
|---|---|---|
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0059311 A1 | 2/2014 | Oberhofer et al. |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0019798 A1 | 1/2015 | Huang |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |
| 2016/0124814 A1* | 5/2016 | Joseph ................... G06F 3/067 714/19 |
| 2017/0024166 A1 | 1/2017 | Singh et al. |
| 2017/0123676 A1 | 5/2017 | Singhai et al. |
| 2017/0308308 A1 | 10/2017 | Ash et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Philip Carns, Robert Ross, Samuel Lang; "Object storage semantics for replicated concurrent-writer file systems", 2010 IEEE International Conference on Cluster Computing Workshops and Posters (Cluster Workshops) (pp. 1-10) (Year: 2010).*

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

* cited by examiner

EFFICIENT VOLUME REPLICATION IN A STORAGE SYSTEM

RELATED APPLICATION

This application claims the benefit of U.S. application Ser. No. 15/337,387, filed Oct. 28, 2016, which is hereby incorporated by reference.

TECHNICAL FIELD

The present disclosure is generally related to data replication, and more particularly, to reading a portion of data to replicate a volume based on sequence numbers.

BACKGROUND

Data replication is a process to copy data from a source storage system to a target storage system. For example, the data may correspond to a volume of data that is present at the source storage system and is transmitted to the target storage system for storage at the target storage system. The volume may be represented by multiple snapshots that represent data of the volume at a particular point in time. To replicate a volume that is represented by multiple snapshots, each of the snapshots from the source storage system may be transmitted to the target storage system and subsequently stored at the target storage system.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Aspects of the present disclosure relate to reading a portion of data to replicate a volume based on sequence numbers. The data may correspond to system data of a storage system. For example, each operation or activity that is performed by the storage system may be represented or specified by the system data. The storage system may be associated with a storage resource that stores a volume that may be represented by one or more snapshots. In general, a snapshot may specify data blocks of the volume that have been changed since a prior time period. For example, a second snapshot may represent data blocks of the volume that have been changed since a prior first snapshot of the volume. Thus, the volume may be represented by multiple snapshots.

The volume may be replicated from a source storage system (e.g., a source solid-state storage array) to a target storage system (e.g., a target solid-state storage array) so that the volume may be stored at the target storage system. To replicate the volume, each of the data blocks specified by each of the snapshots of the volume stored at the source storage system may be transmitted from the source storage system to the target storage system. The data blocks may be identified by analyzing the system data of the source storage system. For example, each operation specified by the system data may be analyzed to determine whether the operation corresponds to a data block of a particular snapshot and then the data block may be transmitted from the source storage system to the target storage system. However, the system data may include a large number of entries as the source storage system may perform many different operations. Analyzing the entire system data may take a large amount of time, thereby resulting in the replication of the volume from the source storage system to the target storage system taking a large amount of time.

Aspects of the present disclosure address the above and other deficiencies by replicating the volume by reading or selecting a portion or subset of the system data based on a sequence number. For example, each operation specified by the system data may be assigned a sequence number. When each operation is performed by the source storage system, the system data may include an entry specifying the operation and is assigned a sequence number that is incremented (or decremented) from a prior sequence number. The system data may further be organized into multiple logical groups where each logical group specifies a different sequence number range.

The target storage system may further store a portion of the snapshots of the volume. In response to a request to replicate the volume from the source storage system to the target storage system, the last (e.g., most recent) snapshot of the volume that is present or stored at the target storage system may be identified. The most recent sequence number (e.g., highest sequence number if the sequence numbers are incremented or lowest sequence number if the sequence numbers are decremented) assigned to the last or final operation or write transaction for the most recent snapshot may be identified. The logical group of the system data with a sequence number range that includes the most recent sequence number associated with the most recent snapshot may be identified. Such a logical group with a sequence number range that includes the most recent sequence number and any other logical group with sequence number range that includes a prior sequence number may be determined to not include system data that is used to replicate the volume. Instead, any logical group with a sequence number range that includes more recent (e.g., higher) sequence numbers may specify operations to snapshots of the volume that are not present at the target storage system. Thus, the logical groups with more recent sequence number ranges may be read to identify a portion of the data blocks of the volume that are associated with snapshots that are not stored at the target storage system. As such, a portion of the system data may be read to identify a portion of data blocks of the volume that should be transmitted to the target storage system to replicate the volume.

Since a portion of the system data is read to identify the data blocks that are to be transmitted to replicate the volume as opposed to reading all of the system data, the time to replicate the volume may be reduced. As such, the performance of the storage systems may be improved as users who are accessing the volume may experience less down time or inaccessibility to the volume as the volume is replicated from the source storage system to the target storage system.

Figure 1:
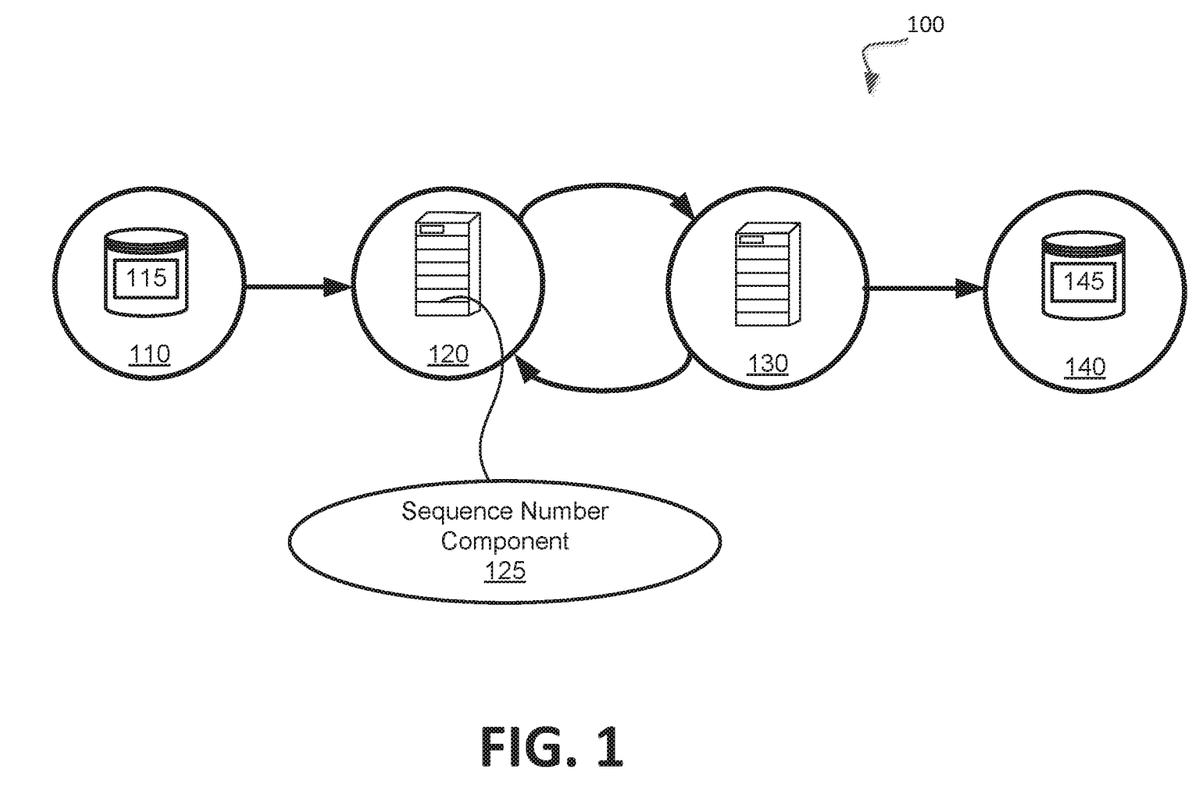
FIG. 1 illustrates an example environment to read a portion of data to replicate a volume based on sequence numbers in accordance with some embodiments of the present disclosure.

FIG. 1 illustrates an example environment 100 to read a portion of data to replicate a volume based on sequence numbers. In general, the environment 100 may include a source storage system 120 that includes a sequence number component 125 that determines a portion of system data to read in order to replicate a volume from the source storage system 120 to a target storage system 130.

As shown in FIG. 1, source storage system 120 (e.g., a flash storage array system or a solid-state storage array) may manage or include a storage resource 110 that stores a volume 115 that is based on multiple snapshots. The target storage system 130 may manage or include a storage resource 140 that stores a volume 145 that is based on or stores a portion of the snapshots of the volume 115. A request to replicate the volume 115 that is stored at the storage resource 110 of the source storage system 120 may be received. In order to replicate the volume 115 at the storage resource 140 of the target storage system 130, data blocks of the volume 115 that are associated with snapshots that are not included in the volume 145 may be transmitted from the source storage system 120 to the target storage system 130.

The sequence number component 125 may be implemented by processing logic that may include hardware (e.g., processing device, circuitry, dedicated logic, programmable logic, microcode, hardware of a device, integrated circuit, etc.), software (e.g., instructions run or executed on a processing device), or a combination thereof. The sequence number component 125 may identify a portion of system data of the source storage system 120 that is to be read to identify data blocks of snapshots that are not present at the target storage system 140 as described in conjunction with FIGS. 2-5.

The storage resources 110 and 140 may correspond to non-disk storage media that is managed by or coupled with the respective source storage system 120 and target storage system 130. For example, the storage resources 110 or 140 may be one or more solid-state drives (SSDs), flash memory based storage, any type of solid-state non-volatile memory, or any other type of non-mechanical storage device. In some embodiments, the storage resources 110 or 140 may be a storage device that includes a flash memory.

Figure 2:
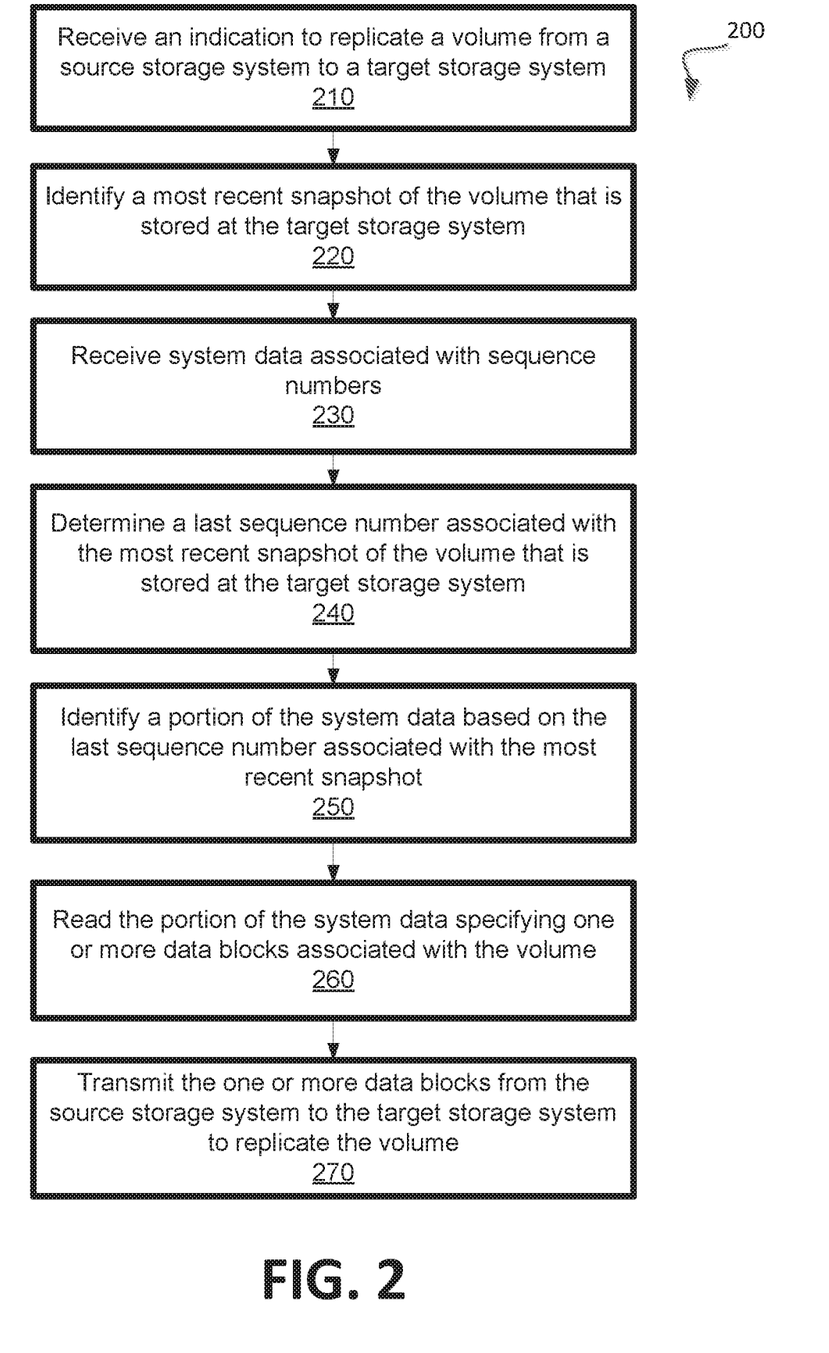
FIG. 2 illustrates an example method to read a portion of data based on a sequence number in accordance with some embodiments of the present disclosure.

FIG. 2 illustrates an example method 200 to read a portion of data based on a sequence number. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the sequence number component 125 of FIG. 1 may perform the method 200.

As shown in FIG. 2, the method 200 may begin with the processing logic receiving an indication to replicate a volume from a source storage system to a target storage system (block 210). For example, a user or administrator may specify to replicate the volume. The replication of the volume may correspond to copying one or more data blocks of the volume that are stored at the source storage system to the target storage system so that each data block of the volume at the source storage system is also present at the target storage system. The processing logic may further identify a most recent snapshot of the volume that is stored at the target storage system (block 220). For example, the target storage system may store a portion of the snapshots of the volume before the replication process is performed. The most recent snapshot may be the latest snapshot that is associated with the last write operations for the volume stored at the target storage system. The processing logic may further receive system data associated with sequence numbers (block 230). The system data may specify each operation performed by the source storage system. Examples of such operations include, but are not limited to, system write transactions, user write transactions, or any other activity associated with the source storage system. The system data may be organized into logical groups where each logical group is assigned a different sequence number range. The processing logic may determine a last sequence number associated with the most recent snapshot of the volume that is stored at the target storage system (block 240). For example, the most recent sequence number assigned to the last write operation to the most recent snapshot may be identified.

The processing logic may identify a portion of the system data based on the last sequence number associated with the most recent snapshot (block 250). For example, the portion of the system data may be identified by using the sequence number ranges for the logical groups of the system data. The system data may be organized into multiple logical groups where each logical group has a different sequence number range. In some embodiments, the sequence number ranges may be assigned to the logical groups in numerical order so that earlier operations of the source storage system are assigned prior sequence numbers (e.g., lower sequence numbers) and later operations of the source storage system are assigned later sequence numbers (e.g., higher sequence numbers). The identified portion of the system data may be the next logical group that is assigned a sequence number range that does not include the last sequence number. For example, one or more logical groups that are assigned sequence number ranges with later sequence numbers than the last sequence number may be identified.

Referring to FIG. 2, the processing logic may read the portion of the system data specifying one or more data blocks associated with the volume (block 260). For example, the logical groups with sequence number ranges that include more recent sequence numbers than the prior identified logical group with a sequence number range that includes the last sequence number of the most recent snapshot at the target storage system be read. Furthermore, the processing logic may transmit the one or more data blocks from the source storage system to the target storage system to replicate the volume (block 270). For example, the data blocks specified by the portion of the system data (e.g., the logical groups with more recent sequence numbers) may be identified after reading the portion of the system data and then transmitted to the target storage system.

In some embodiments, the snapshots of the volume that are stored at the target storage system may be later snapshots of the volume. For example, the target system may not currently store a first snapshot of the volume but may store a second later snapshot of the volume. In such a case, the portion of the system data that is identified may be based on the first sequence number of the second later snapshot of the volume so that logical groups of the system data that include prior sequence numbers than the first sequence number of the second later snapshot may be read. In the same or alternative embodiments, the target storage system may store intermediate snapshots of the volume. For example, a first snapshot of the volume and a last snapshot of the volume may be stored at the target storage system but a second snapshot of the volume that is after the first snapshot but before the last snapshot may not be stored at the target storage system. The portion of the system data that is identified may be based on the first sequence number of the last snapshot and the last sequence number of the first snapshot. For example, logical groups of the system data that include sequence numbers later than the last sequence number of the first snapshot and prior to the first sequence number of the last snapshot may be read.

Figure 3:
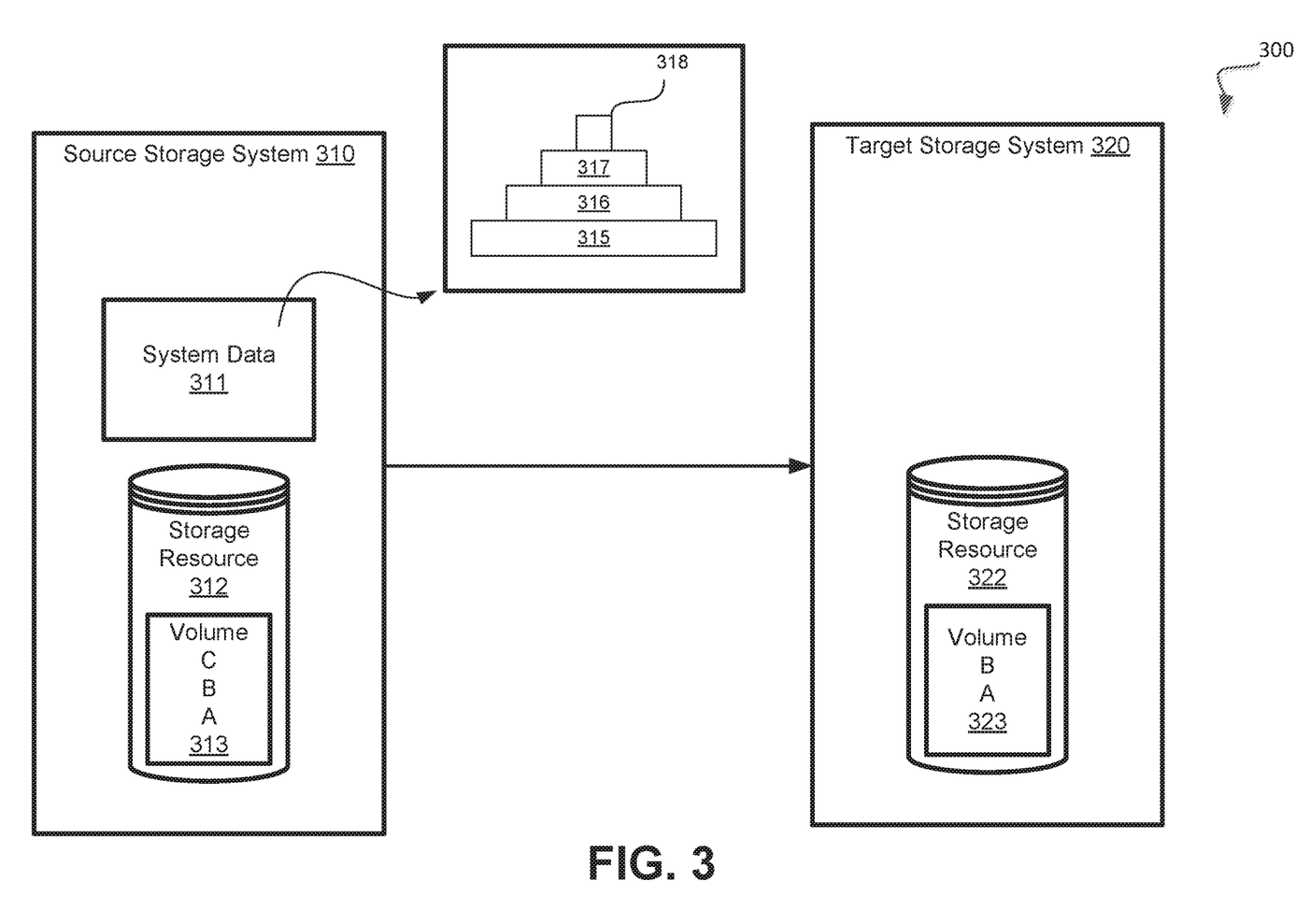
FIG. 3 is an example environment with a source storage system and a target storage system for replicating a volume based on reading a portion of data in accordance with some embodiments.

FIG. 3 illustrates an example environment 300 with a source storage system and a target storage system for replicating a volume based on reading a portion of data. In general, the environment 300 may include a source storage system 310 that may correspond to the source storage system 120 of FIG. 1 and a target storage system 320 that may correspond to the target storage system 130 of FIG. 1.

As shown in FIG. 3, the source storage system 310 may manage a source storage resource 312 (e.g., a solid-state non-volatile memory such as flash memory) and the target storage system 320 may manage a target storage resource 322. The source storage system 310 and the target storage system may be a solid-state storage array system such as, but not limited to, a flash storage array system. The source storage resource 312 may store a volume 313 that is based on multiple snapshots. For example, the volume 313 may be based on snapshots A, B, and C. Furthermore, the target storage resource 323 may store a portion of the snapshots of the volume 313. For example, the target storage resource 323 may include a volume 323 that has less snapshots of the volume 313 (e.g., snapshots A and B). Thus, in order to replicate the volume 313, the data blocks of the volume 313 corresponding to snapshot C may be transmitted from the source storage system 310 to the target storage system 320 by using system data 311.

The system data 311 may record operations performed by the source storage system 310. For example, the system data 311 may be organized into logical groups 315, 316, 317, and 318. Each of the logical groups may be assigned a sequence number range. In some embodiments, the sequence number ranges may be incremented or decremented from prior sequence number ranges for logical groups that record prior operations performed by the source storage system 310. Furthermore, in some embodiments, a prior logical group specifying prior operations may specify more operations and be associated with a larger sequence number range than a later logical group specifying later operations.

In operation, a request to replicate the volume 313 from the source storage system 310 to the target storage system 320 may be received. The most recent snapshot stored at the target storage system may be identified as snapshot B and the last sequence number associated with snapshot B may be identified. The source storage system 310 may subsequently retrieve the system data and identify that logical group 316 includes a sequence number range that includes the last sequence number associate with snapshot B. The logical groups with higher sequence number ranges (e.g., logical groups 317 and 318) may then be selected and read to identify the data blocks that correspond to snapshot C that should be transmitted to the target storage system 320 to replicate the volume 313.

Figure 4:
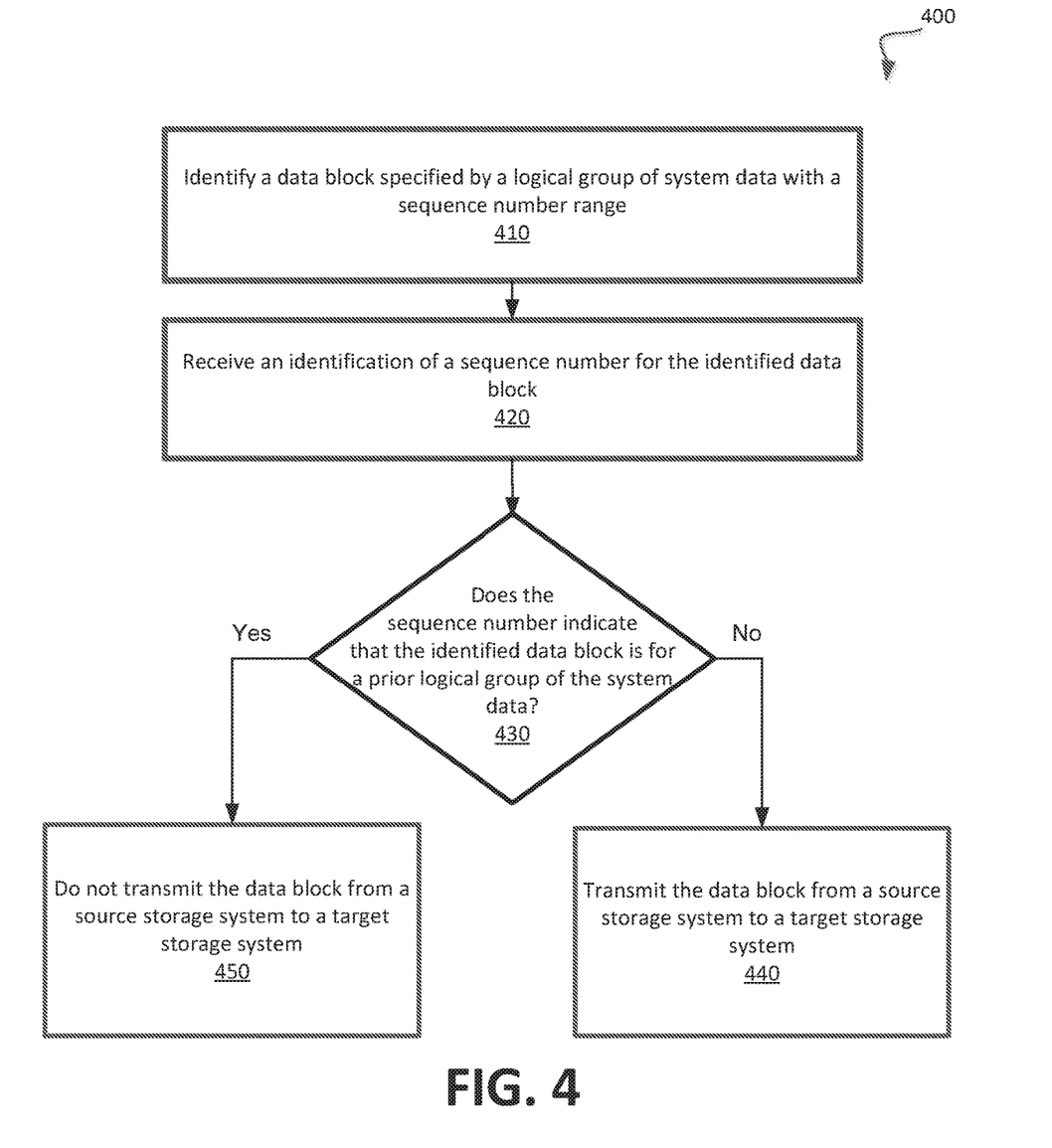
FIG. 4 is an example method to transmit a data block from a source storage system to a target storage system in accordance with some embodiments.

FIG. 4 is an example method 400 to transmit a data block from a source storage system to a target storage system. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the sequence number component 125 of FIG. 1 may perform the method 400.

As shown in FIG. 4, the method 400 may begin with the processing logic identifying a data block specified by a logical group of the system data with a sequence number range (block 410). For example, a logical group of the system data that includes higher sequence numbers than a last sequence number for a snapshot that is stored at a target storage system may be identified. Thus, the logical group may specify data blocks that are associated with a snapshot that is not stored at the target storage system. The data block may be one of multiple data blocks specified by the logical group. The processing logic may further receive an identification of a sequence number for the identified data block (block 420). For example, a sequence number assigned to the data block may be received. The processing logic may further determine whether the sequence number for the identified data block is for a prior logical group of the system data (block 430). For example, the determination may correspond to whether the sequence number of the data block is included in the sequence number range for the logical group. The sequence number may be not included in the sequence number range for the logical group when the sequence number is prior to (e.g., less than if sequence numbers are incremented) the earliest sequence number of the sequence number range. If the sequence number for the identified data block is for a prior logical group, then the processing logic may not transmit the data block from a source storage system to a target storage system (block 450). Otherwise, if the sequence number for the identified data block is not for a prior logical group, then the processing logic may transmit the data block from the source storage system to the target storage system (block 440).

Thus, a data block included in a logical group may be transmitted when the sequence number assigned to the operation associated with the data block is within the sequence number range of a logical group. Otherwise, if the data block is assigned a sequence number that is not within the sequence number range, then a determination may be made to not transmit the data block to the target storage system.

Figure 5:
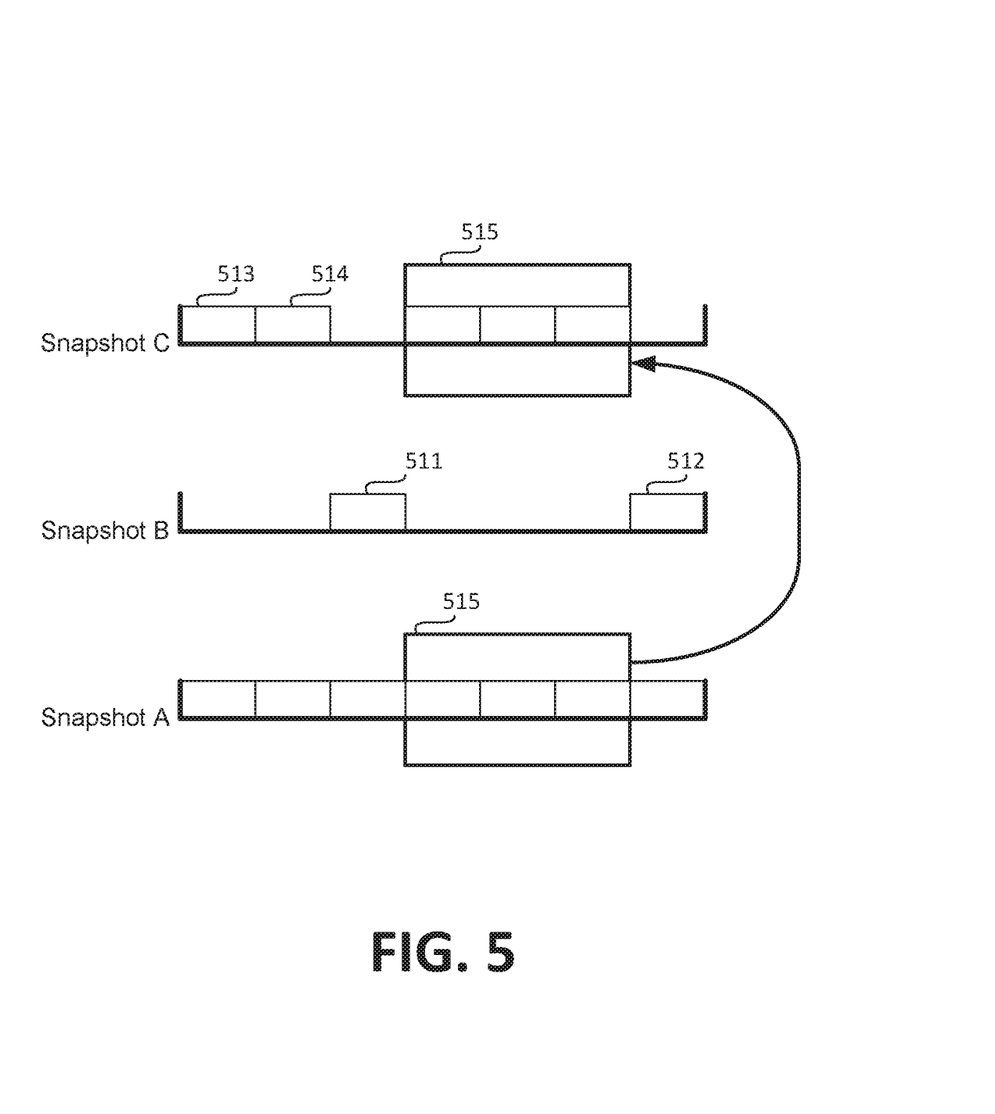
FIG. 5 is an example of data blocks of a logical group that are associated sequence number identifications in accordance with some embodiments of the present disclosure.

FIG. 5 is an example 500 of data blocks of a logical group that are associated sequence number identifications. In general, the logical groups of example 500 may be maintained by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the sequence number component 125 of FIG. 1 may maintain the logical groups.

In general, the source storage system may perform a background process that may perform system write operations to copy or move system data associated with data blocks of prior snapshots. For example, as shown, snapshot A may include multiple data blocks, snapshot C may include data blocks 511 and 512, and snapshot C may include data blocks 513, 514, and a group of data blocks 515 that are copied or moved from the snapshot A. The group of data blocks 515 may be copied from a prior snapshot (e.g., snapshot A) to a later snapshot (e.g., snapshot C) if the respective data blocks are not in the most recent snapshot of the volume (e.g., snapshot C) or the second most recent snapshot of the volume (e.g., snapshot B).

As previously discussed, each of the data blocks of a logical group that represents operations may specify the data blocks of a snapshot. For example, a most recent logical group may specify operations associated with the data blocks of snapshot C. The logical group may specify data blocks 513, 514, and the group of data blocks 515. The data blocks 513 and 514 may be assigned respective recent sequence numbers as the data blocks 513 and 514 are associated with write operations for the snapshot C. The group of data blocks 515 may be assigned a prior sequence number since the group of data blocks are associated with write operations for the snapshot A. However, due to a system write operation (e.g., the background process that is performed), the system data for the group of data blocks 515 may be copied from the logical group specifying operations including the snapshot A to the logical group specifying operations including the snapshot C. Thus, logical group associated with the snapshot C may specify data blocks with recent sequence numbers as well as prior sequence numbers for a prior logical group. In operation, the data blocks 513 and 514 may be transmitted to the target storage system while the group of data blocks 515 may not be transmitted to the target storage system since the group of data blocks 515 are associated with prior sequence numbers that are associated with a prior snapshot that may be present at the target storage system.

Figure 6:
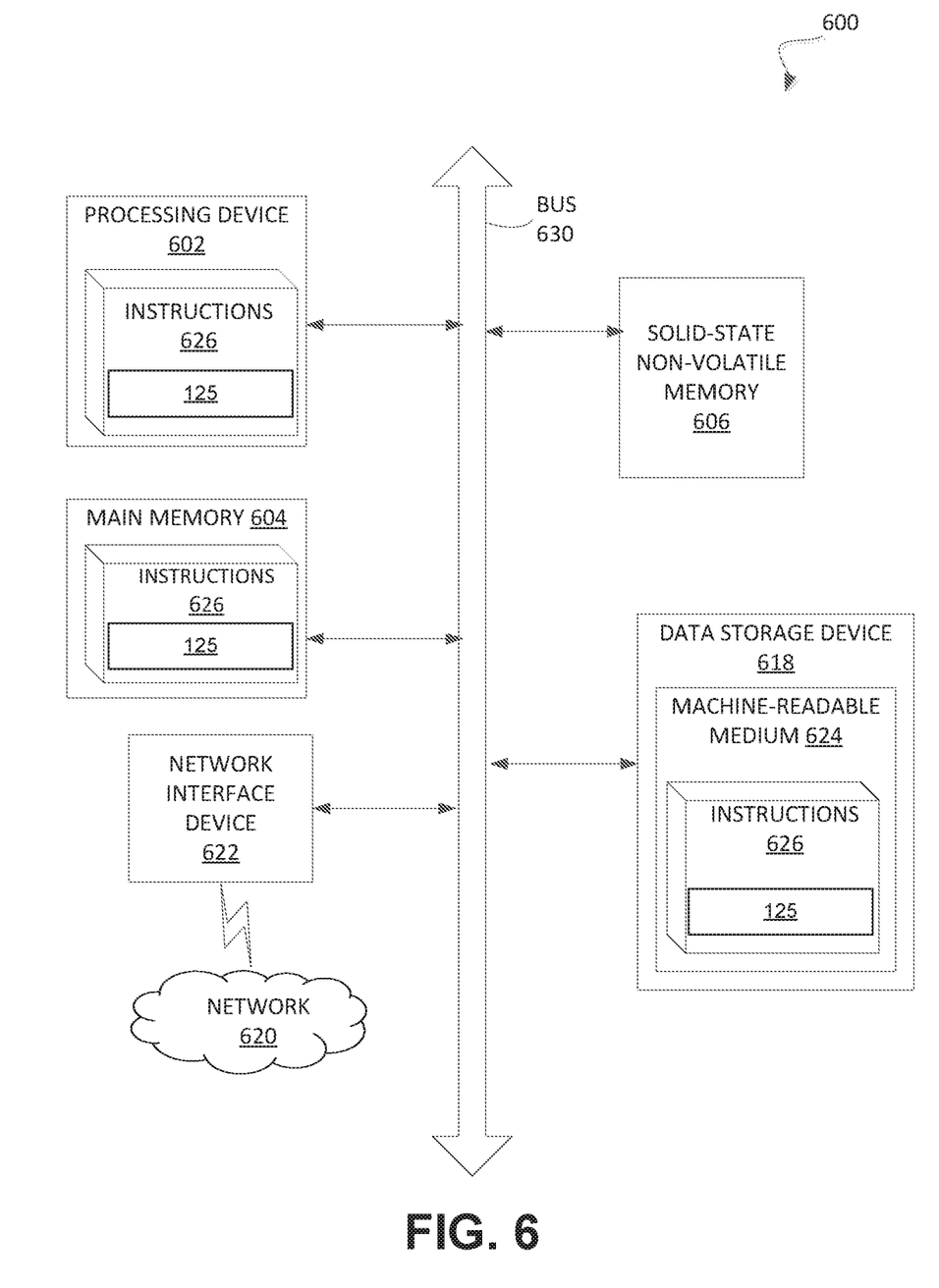
FIG. 6 is a block diagram of an example computer system operating in accordance with the disclosure described herein.

FIG. 6 depicts an example computer system 600 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a solid-state non-volatile memory 606 (e.g., flash memory, 3D crosspoint (XPoint) memory, magnetoresistive random-access memory (MRAM), or any other such storage media that does not use a physical disk), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the sequence number component 125 of FIG. 1 for performing the operations and steps discussed herein. The computer system 600 may further include a network interface device 622. The data storage device 616 may include a computer-readable medium 624 on which is stored the sequence number component 125 embodying any one or more of the methodologies or functions described herein. The sequence number component 125 may also reside, completely or at least partially, within the main memory 604 and/or within the processing device 602 during execution thereof by the computer system 600, the main memory 604 and the processing device 602 also constituting computer-readable media. The sequence number component 125 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "using," "registering," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving a request to replicate a volume at a source solid-state storage array to a target solid-state storage array, the volume corresponding to a plurality of snapshots associated with data blocks that are stored at the source solid-state storage array;
   identifying a most recent snapshot of the plurality of snapshots corresponding to the volume at the source solid-state storage array that is present at the target solid-state storage array;
   identifying metadata organized into a plurality of logical groups, each of the logical groups corresponding to a sequence number range and including a portion of the metadata that is associated with a portion of the data blocks of the volume, wherein each sequence number range comprises a plurality of sequence numbers that are assigned to each operation associated with the source solid-state storage array;
   determining a last sequence number associated with the most recent snapshot of the plurality of snapshots that is present at the target solid-state storage array;
   identifying, by a processing device, a logical group of the plurality of logical groups with a corresponding sequence number range that includes the last sequence number associated with the most recent snapshot; and
   reading the metadata to identify a portion of the data blocks to transmit to the target solid-state storage array to replicate the volume based on a next logical group of the plurality of logical groups with a corresponding sequence number range with higher sequence numbers than the identified logical group.

2. The method of claim 1, wherein the sequence numbers are incremented in response to each operation.

3. The method of claim 1, wherein the reading of the metadata to replicate the volume based on the next logical group comprises:
   reading additional metadata based on logical groups of the plurality of logical groups with corresponding sequence number ranges with later sequence numbers than the next logical group.

4. The method of claim 1, wherein the metadata specifies the data blocks of the volume that are associated with an operation, and wherein a first group of the plurality of logical groups with later sequence numbers than a second group of the plurality of logical groups specifies operations that are received after operations associated with the second group.

5. The method of claim 2, further comprising:
   receiving identifiers associated with sequence numbers for data blocks specified by the next logical group of the plurality of logical groups of the metadata; and
   determining, based on the identifiers, whether the data blocks are associated with another sequence number range with prior values for another logical group of the plurality of logical groups than the sequence number range of the next logical group.

6. The method of claim 5, wherein reading the metadata further comprises:
- determining to read a first portion of the metadata of the next logical group for data blocks associated with sequence numbers that are included in the sequence number range of the next logical group; and
- determining to not read a second portion of the metadata of the next logical group for data blocks associated with sequence numbers that are included in the another sequence number range with prior values than the sequence number range of the next logical group.

7. The method of claim 6, wherein data blocks specified by the next logical group of the plurality of logical groups are associated with a previous snapshot.

8. A system comprising:
- a memory; and
- a processing device, operatively coupled with the memory, to:
  - receive an indication to replicate, for a second storage resource, a volume that is stored at a first storage resource;
  - identify a snapshot of the volume that is stored at the second storage resource;
  - identify data associated with operations to data blocks of the volume;
  - receive a sequence number associated with the snapshot of the volume that is stored at the second resource; and
  - read a portion of the data associated with the operations to the data blocks of the volume based on the sequence number that is associated with the snapshot of the volume that is stored at the second resource to replicate the volume at the second storage resource, wherein the sequence number is associated with a plurality of sequence numbers, each sequence number being assigned to each of the operations to the data blocks of the volume or each operation associated with the first storage resource.

9. The system of claim 8, wherein the volume corresponds to a plurality of snapshots and the snapshot stored at the second storage resource is a most recent snapshot of the volume that is stored at the second storage resource and the sequence number associated with the snapshot stored at the second resource is associated with a last operation to the data blocks of the volume for the snapshot.

10. The system of claim 8, wherein the sequence numbers are incremented or decremented in response to each operation.

11. The system of claim 8, wherein the data is organized into a plurality of logical groups, and wherein a first group of the plurality of logical groups with later sequence numbers than a second group of the plurality of logical groups specifies operations that are received after operations associated with the second group.

12. The system of claim 9, wherein to read the portion of the data, the processing device is further to:
- receive identifiers associated with sequence numbers for data blocks associated with the portion of the data; and
- determine, based on the identifiers, whether the data blocks associated with the portion of the data are associated with a prior sequence number than sequence numbers of a sequence number range associated with the portion of the data.

13. The system of claim 12, wherein to read the portion of the data, the processing device is further to:
- determine to read a first subset of the portion of the data for data blocks associated with sequence numbers that are included in the sequence number range associated with the portion of the data; and
- determine to not read a second subset of the portion of the data metadata for data blocks associated with sequence numbers that are included in the another sequence number range with prior values than the sequence number range associated with the portion of the data.

14. A non-transitory computer readable storage medium storing instructions, which when executed, cause a processing device to:
- receive an indication to replicate, for a second storage resource, a volume that is stored at a first storage resource;
- identify a snapshot of the volume that is stored at the second storage resource;
- identify data associated with operations to data blocks of the volume;
- receive a sequence number associated with the snapshot of the volume that is stored at the second resource; and
- read, by the processing device, a portion of the data associated with the operations to the data blocks of the volume based on the sequence number that is associated with the snapshot of the volume that is stored at the second resource to replicate the volume at the second storage resource, wherein the sequence number is associated with a plurality of sequence numbers, each sequence number being assigned to each of the operations to the data blocks of the volume or each operation associated with the first storage resource.

15. The non-transitory computer readable storage medium of claim 14, wherein the volume corresponds to a plurality of snapshots and the snapshot stored at the second storage resource is a most recent snapshot of the volume that is stored at the second storage resource and the sequence number associated with the snapshot stored at the second resource is associated with a last operation to the data blocks of the volume for the snapshot.

16. The non-transitory computer readable storage medium of claim 14, wherein the sequence numbers are incremented or decremented in response to each operation.

17. The non-transitory computer readable storage medium of claim 14, wherein the data is organized into a plurality of logical groups, and wherein a first group of the plurality of logical groups with later sequence numbers than a second group of the plurality of logical groups specifies operations that are received after operations associated with the second group.

18. The non-transitory computer readable storage medium of claim 14, wherein to read the portion of the data, the processing device is further to:
- receive identifiers associated with sequence numbers for data blocks associated with the portion of the data;
- determine, based on the identifiers, whether the data blocks associated with the portion of the data are associated with a prior sequence number than sequence numbers of a sequence number range associated with the portion of the data;
- determine to read a first subset of the portion of the data for data blocks associated with sequence numbers that are included in the sequence number range associated with the portion of the data; and
- determine to not read a second subset of the portion of the data metadata for data blocks associated with sequence numbers that are included in the another sequence number range with prior values than the sequence number range associated with the portion of the data. of the data.

* * * * *